US012589858B2

(12) United States Patent

Schlipf et al.

(10) Patent No.: US 12,589,858 B2

(45) Date of Patent: Mar. 31, 2026

(54) WING FOR AN AIRCRAFT AND HIGH LIFT ASSEMBLY

(71) Applicant: Airbus Operations GmbH, Hamburg (DE)

(72) Inventors: Bernhard Schlipf, Hamburg (DE); Oliver Seack, Hamburg (DE); Jan Haunert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/769,024

(22) Filed: Jul. 10, 2024

(65) Prior Publication Data

US 2025/0019062 A1    Jan. 16, 2025

(30) Foreign Application Priority Data

Jul. 12, 2023    (EP) ..................................... 23184990

(51) Int. Cl.
| | |
|---|---|
| *B64C 9/24* | (2006.01) |
| *B64C 9/16* | (2006.01) |
| *B64C 9/22* | (2006.01) |

(52) U.S. Cl.
CPC .................. *B64C 9/24* (2013.01); *B64C 9/16* (2013.01); *B64C 9/22* (2013.01)

(58) Field of Classification Search
CPC .... B64C 9/16; B64C 9/18; B64C 9/20; B64C 9/22; B64C 9/24; B64C 9/26; B64C 9/28
See application file for complete search history.

(56) References Cited

U.S. PATENT DOCUMENTS

2011/0168849 A1    7/2011  Parker

FOREIGN PATENT DOCUMENTS

GB        1572004 A      7/1980

OTHER PUBLICATIONS

European Search Report for corresponding European Patent Application No. 23184990.2 dated Dec. 8, 2023.

*Primary Examiner* — Nicholas McFall

(74) *Attorney, Agent, or Firm* — Greer Burns & Crain Ltd.

(57)    ABSTRACT

A wing for an aircraft, comprising a main wing and a high lift assembly which includes a body, and an assembly connecting the body to the main wing, so the body is movable between a retracted position and an extended position. The assembly comprises a track extending along a longitudinal axis between first and second ends, with an intermediate portion therebetween. A roller bearing ensures that the track moves along the longitudinal axis. The roller bearing comprises bearing units, each mounted to the main wing and having a bearing surface for engaging the elongate track. The units include a first and second end units and an intermediate unit wherein, relative to the longitudinal axis, the intermediate unit is positioned between the first end unit and the second end unit. The elongate track comprises a recessed portion which, in the retracted position, aligns the intermediate unit.

14 Claims, 8 Drawing Sheets

B - B

138a

137

134c

138b

134c

B

B

C - C

234c 234c
240
223
219
217

334c
342
317

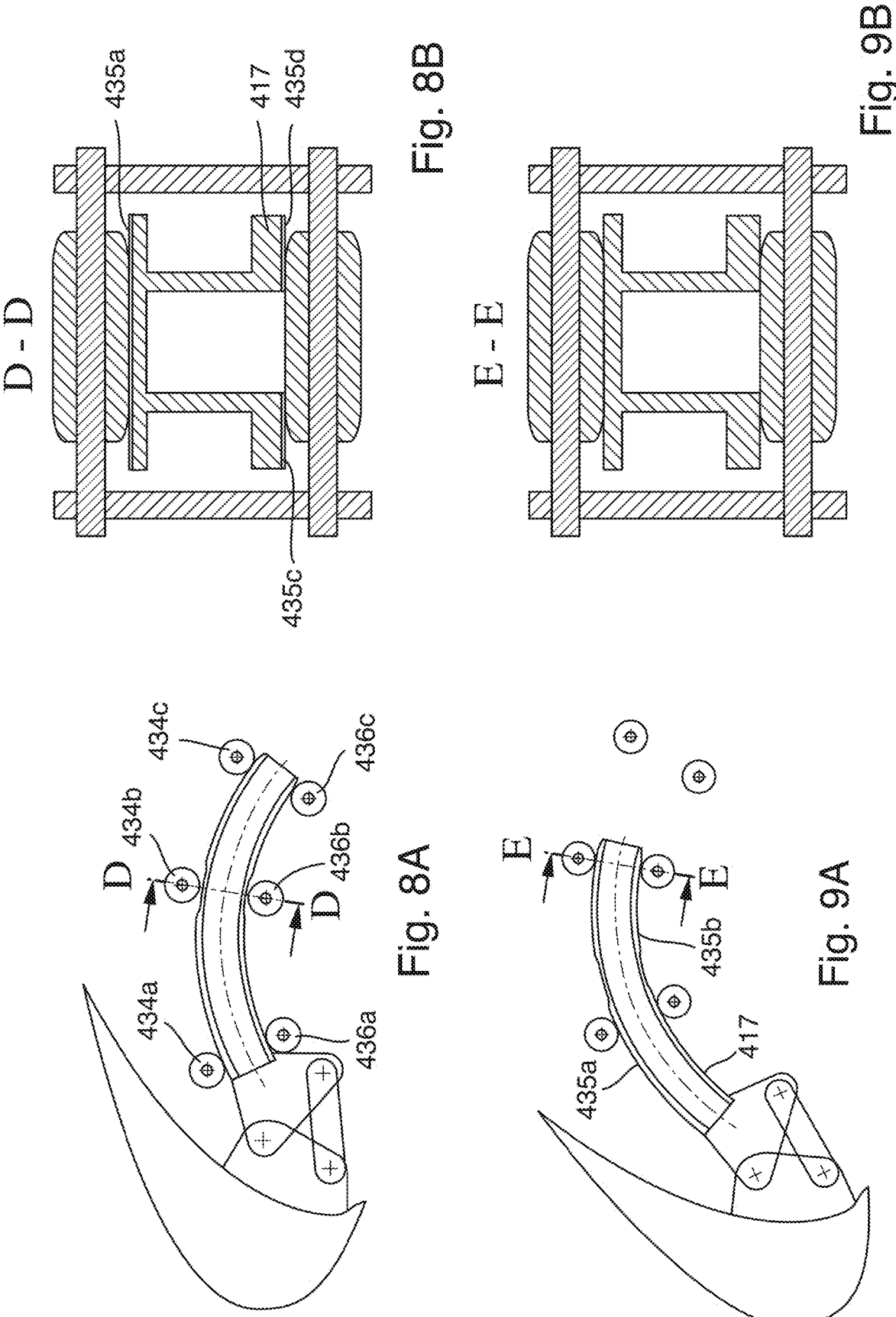

WING FOR AN AIRCRAFT AND HIGH LIFT ASSEMBLY

CROSS-REFERENCES TO RELATED APPLICATIONS

This application claims the benefit of European Patent Application Number 23 184 990.2 filed on Jul. 12, 2023, the entire disclosure of which is incorporated herein by way of reference.

FIELD OF THE INVENTION

The present invention relates to a wing for an aircraft. Further aspects of the invention relate to a high lift assembly for such a wing, as well as to an aircraft comprising such a wing and/or comprising such a high lift assembly.

BACKGROUND OF THE INVENTION

The described wing for an aircraft comprises a main wing and a high lift assembly, the high lift assembly comprising a high lift body and a connection assembly movably connecting the high lift body to the main wing such that the high lift body is movable between a retracted position and at least one extended position (e.g., movable relative to the main wing). The high lift body may be or comprise a leading edge slat or a trailing edge flap of a wing for an aircraft.

The connection assembly comprises an elongate track that extends along a track longitudinal axis between a first end and a second end and has an intermediate portion between the first and second ends. The elongate track may have a curved or straight form along the track longitudinal axis. At least one, or both, of the first end and the intermediate portion of the elongate track is/are mounted to the high lift body.

The first end may correspond to a front end of the connection assembly, e.g. the end positioned towards the intended direction of forward motion of the wing during flight of an aircraft. Alternatively, the first end may correspond to a rear end of the connection assembly, e.g., the end positioned away from the intended direction of forward motion of the wing during flight of an aircraft. Where the high lift body is or comprises a leading edge slat, then the first end may correspond to the front end of the connection assembly. Where the high lift body is or comprises a trailing edge flap, then the first end may correspond to the rear end of the connection assembly.

The first end of the elongate track may be preferably mounted to either a leading edge slat, or to a trailing edge flap by any appropriate means, e.g., by an arrangement of spherical bearings, preferably in a fixed manner with respect to a chord plane. The elongate track may be preferably mounted to the main wing by a roller bearing, as will be described, such that the elongate track and either the leading edge slat or the trailing edge flap are moveable relative to the main wing. The elongate track may take the form of, for example, a C-shape, such that its surface lies opposite the circumferential surface of the roller bearing, wherein the distance between an upper surface and a lower surface of the elongate track is larger than a diameter of a roller bearing, such that the roller bearing may engage only one of the upper surface or the lower surface of the elongate track at any one time, i.e., the distance between the upper and lower surfaces of the elongate track is selected such that a clearance is provided between the roller bearing and either the upper surface or the lower surface of the elongate track, such that the roller bearing cannot engage with the upper and lower surfaces of the elongate track at the same time, thereby becoming wedged therein.

The elongate track is mounted to the main wing by a roller bearing such that the track is movable along the track longitudinal axis, for example along a predefined path e.g., on the track longitudinal axis, such as between a stowed position which the high lift body is in the retracted position and a deployed position when the high lift body is in one of the at least one extended positions.

The roller bearing comprises a plurality of bearing units that are mounted to the main wing and have a bearing surface that engages an engagement surface provided on the elongate track.

Wings for aircraft comprising connection assemblies that movably connect a high lift body to the main wing are known to comprise tracks that are mounted to the main wing via a roller bearing. It is known that keeping such tracks short has the benefit that the front spar of the wing is not penetrated by the track, thus reducing the manufacturing complexity as well as the risk of leaks later in service. The roller bearing of known assemblies experiences a transfer of force from the wing to the elongate track, and thus the roller units of the roller bearing are often positioned as far apart as possible in order to maximize the lever arm therebetween, thus minimizing the transfer of force therethrough. This configuration requires additional rails to support the bearings, which can make the bearing more complex than necessary, while also requiring additional parts, which can add weight to a design.

SUMMARY OF THE INVENTION

Therefore, an object of the present invention is to provide a non-complex, lightweight and low maintenance design of a main wing and associated high lift body and connection assembly.

The object may be achieved in that the plurality of bearing units comprise a first end roller unit, an intermediate roller unit and a second end bearing unit, wherein the plurality of bearing units are positioned such that, relative to the track longitudinal axis, the intermediate roller unit is positioned between the first end roller unit and the second end bearing unit. The roller unit may be mounted to the main wing in any appropriate way, for example may be fixed or fastened to the main wing, for example may be bolted to the main wing.

Further, the absorbing of the loads (e.g., substantially all the loads or the principal loads or main loads, which may be the majority of the loads) between the main wing and the elongate track may be done by the roller bearing. The elongate track and the roller bearing are configured such that in the retracted position load (in particular the main loads) is transferred (e.g., exclusively transferred) between the elongate track and the main wing (preferably between the elongate track and the roller bearing) via the first end roller unit (e.g., the principal loads are transferred, e.g., exclusively transferred, between the elongate track and the main wing via the first end roller unit) and the second end bearing unit, whereas in the extended position load (in particular the main loads) is transferred between the elongate track and the main wing (preferably between the elongate track and the roller bearing) via the first end roller unit and the intermediate roller unit. This might be achieved by the elongate track and the roller bearing being configured such that in the retracted position (load bearing) contact is present (only) between the elongate track and the first end roller unit as well as between the elongate track and the second end bearing unit, whereas in the extended position (load bearing) contact is present (only) between the elongate track and the first end roller unit as well as between the elongate track and the intermediate roller unit.

Having an intermediate roller unit permits the elongate track to be fully supported without the need for an additional rail. At the same time, the length of the track can be reduced while loads can be reduced in the retracted position, in particular during cruise flight.

According to a preferred embodiment, the elongate track further comprises a recessed portion which aligns with the intermediate roller unit in the retracted position such that the contact force between the intermediate roller and the engagement surface of the elongate track is reduced or eliminated, thereby avoiding the roller bearing being over constrained, and thereby resulting in additional forces acting between the roller bearing and the elongate track. Further, the lack of an additional rail, plus the configuration of the first and second roller/bearing units may permit a more compact arrangement, thus providing the possibility of easier incorporation of a drive mechanism in the connection assembly, such as a rack-and-pinion or a drive strut combined with a rotary drive. In this case, all or the majority of the load (e.g., the principal loads or main loads) between the wing and the elongate track may be absorbed by the first end roller unit and the second end bearing unit.

According to a preferred embodiment, when the high lift body is in the retracted position, the intermediate roller unit may be configured to disengage with the engagement surface such that a clearance gap exists between the intermediate roller unit and the engagement surface, and the first end roller unit and the second end bearing unit are configured to engage the engagement surface. When the high lift body is in an extended position, the second end bearing unit may be configured to disengage with the engagement surface and the intermediate roller unit and the first end roller unit is configured to engage with the engagement surface. Allowing the first end roller unit and the second end bearing unit to engage the engagement surface when the high lift body is in the extended position may reduce the contact forces by increasing the length of the lever arm between the bearings.

The elongate track (e.g. the engagement surface) may be configured to be simultaneously engaged by the first end roller unit and either the intermediate roller unit or the second end bearing unit. As such the elongate track may only simultaneously be engaged by two (e.g., exactly two) roller and/or bearing units (e.g., on one side thereof). Where the connection assembly comprises a second set of engagement surfaces (e.g., a mirrored set of engagement surfaces) as will be described further in more detail in the following paragraphs, the elongate track may be simultaneously engaged by four (e.g., exactly four) roller and/or bearing units, which may correspond to two roller and/or bearing units per set of engagement surfaces. Limiting the number of roller and/or bearing units in engagement with the elongate track may reduce the risk of the elongate track being over constrained.

The recessed portion may define a discontinuity in the engagement surface dividing the engagement surface into a first engagement surface extending in a first direction parallel to the track longitudinal axis, and a second engagement surface extending in a second direction parallel to the track longitudinal axis, wherein the first end roller unit is configured to engage the first engagement surface, and the intermediate roller unit and second end bearing are configured to engage the second engagement surface. In providing a divided set of engagement surfaces, the forces acting on the elongate track may be more evenly distributed therealong.

The recessed portion may comprise a graduated transition to the engagement surface in the form of a ramp. As such, the contact forces may be reduced gradually as a roller and/or bearing unit progresses along the ramp, and may be completely removed e.g., where the roller and/or bearing unit disengages from the engagement surface.

The recessed portion may be defined by a reduction in thickness of the elongate track, e.g., a part thereof. The elongate track may comprise a first and second flange connected by a web, so as to form a C-shape. The recessed portion may be defined by a reduction in thickness in one or both of the first and second flanges. Where both flanges comprise a reduction in thickness, the thickness reductions may be longitudinally aligned on the track longitudinal axis.

The second end bearing unit may be a roller unit. The second end bearing unit may comprise a contact pad arrangement and may comprise at least one contact pad surface comprising a crowned surface, thus increasing the contact area therebetween.

The second end bearing unit may comprise a conical or frustum-conically shaped bearing which, when engaged with the engagement surface, may comprise a longitudinal axis that is parallel with the track longitudinal axis. The second bearing unit may comprise a protrusion mounted to the main wing, and the elongate track may comprise a recess having a profile configured to receive and mate with the second bearing unit. The second end bearing unit may therefore be shaped so as to provide a guiding effect for engagement between the elongate track and the second end bearing unit.

The elongate track may comprise a first and second internally oriented engagement surface and a first and second externally oriented engagement surface. The first internally oriented engagement surface may face the second internally oriented engagement surface, and the first externally oriented engagement surface may face away from the second externally oriented engagement surface. Each of the first end roller unit, the intermediate roller unit and the second end bearing unit may be configured to engage at least one of the first and second internally oriented engagement surfaces and the first and second externally oriented engagement surfaces.

The plurality of bearing units may comprise a pair of first end roller units, one of the first end roller units may be configured to engage the first externally oriented engagement surface, and the other of the first end roller units may be configured to engage the second externally oriented engagement surface, and the intermediate roller unit and second end bearing unit may be configured to engage at least one of the first and second internally oriented engagement surfaces.

The plurality of bearing units may comprise a pair of first end roller units, a pair of intermediate roller units, and a pair of second end bearing units, one of the first end roller units, intermediate roller units and second end bearing units configurable to engage the first externally oriented engagement surface and the other of the first end roller units, intermediate roller units and second end bearing units configurable to engage the second externally oriented engagement surface. Having a pair or several pairs of roller and/or bearing units may allow a much greater load to be taken by the roller/bearing units, and therefore may be useful in situations in which it is knows that loading will be particularly high.

The connection assembly may comprise a track having a first set of an engagement surface or surfaces and corresponding first end roller unit, intermediate roller unit and second end bearing unit, and also having a second set of an engagement surface or surfaces, corresponding first end roller unit, intermediate roller unit and second end bearing unit. The second set may be a mirror of the first set. Both the first and second set of roller/bearing units may be connected to the main wing.

A further aspect relates to a high lift assembly for the wing as has been described in any of the preceding paragraphs. The high lift assembly comprises a high lift body, and a connection assembly configured for movably connecting the high lift body to the main wing such that the high lift body is movable between a retracted position and at least one extended position. The connection assembly comprises an elongate track that extends along a track longitudinal axis between a first end and a second end and has an intermediate portion between the first and second ends. The first end and/or the intermediate portion of the track is mounted to the high lift body, and the elongate track is configurable to be mounted to the main wing by a roller bearing such that the track is movable along the track longitudinal axis wherein the roller bearing comprises a plurality of bearing units, each of the bearing units being configurable to be mounted to the main wing and having a bearing surface configurable to engage an engagement surface provided on the elongate track.

According to this aspect, the plurality of bearing units comprises a first end roller unit, an intermediate roller unit and a second end bearing unit, and the plurality of bearing units are positioned such that, relative to the track longitudinal axis, the intermediate roller unit is positioned between the first end roller unit and the second end bearing unit. The elongate track and the roller bearing are configured such that in the retracted position main loads are transferred between the elongate track and the roller bearing via the first end roller unit and the second end bearing unit, whereas in the extended position main loads are transferred between the elongate track and the roller bearing via the first end roller unit and the intermediate roller unit.

Another aspect relates to an aircraft comprising a wing according to any of the previous paragraphs, the wing comprising a high lift assembly as has been described.

It should be noted that, although in the above description the elongate track has been described as being mounted to the main wing by a roller bearing, it may be possible to replace the roller bearing with a slider bearing. In this example, the first end roller unit, intermediate roller unit and second end bearing unit may each be represented by a slider bearing unit, such that sliding contact exists between the engagement surface and the slider bearing units, when contact therebetween is present.

BRIEF DESCRIPTION OF THE DRAWINGS

FIG. 8A is a side view of a disclosed connection assembly in a further configuration;

FIG. 8B is a cross sectional view of the connection assembly of FIG. 8A;

FIG. 9A is a side view of a disclosed connection assembly in an additional configuration;

FIG. 9B is a cross sectional view of the connection assembly of FIG. 9A; and,

DETAILED DESCRIPTION OF THE PREFERRED EMBODIMENTS

Figure 1:
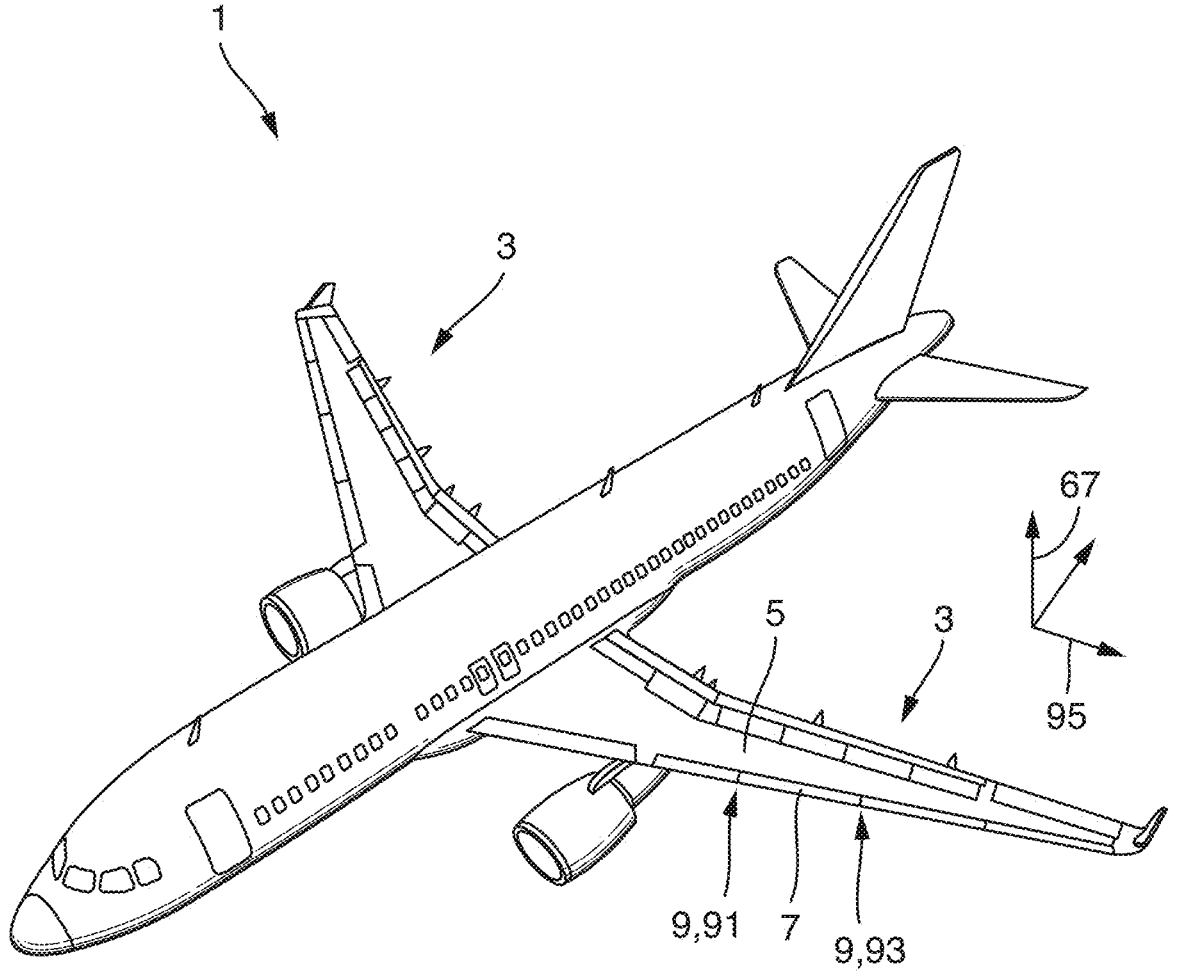
FIG. 1 is a perspective view of an aircraft, showing a wing of the aircraft.

In FIG. 1 an aircraft 1 according to an embodiment of the present invention is illustrated. The aircraft 1 comprises a wing 3 that is formed according to an embodiment of the present invention.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a wing span direction 95, and wherein the second connection assembly 93 is formed as the first connection assembly 91. Additionally illustrated in FIG. 1 is a wing thickness direction 67. While, in FIG. 1, the connection assembly 9 is illustrated as connecting slat 7 to the main wing 5, it should also be understood that the connection assembly 9 may be used to connect a trailing edge flap 2 to the wing 5 of an aircraft.

Figure 2:
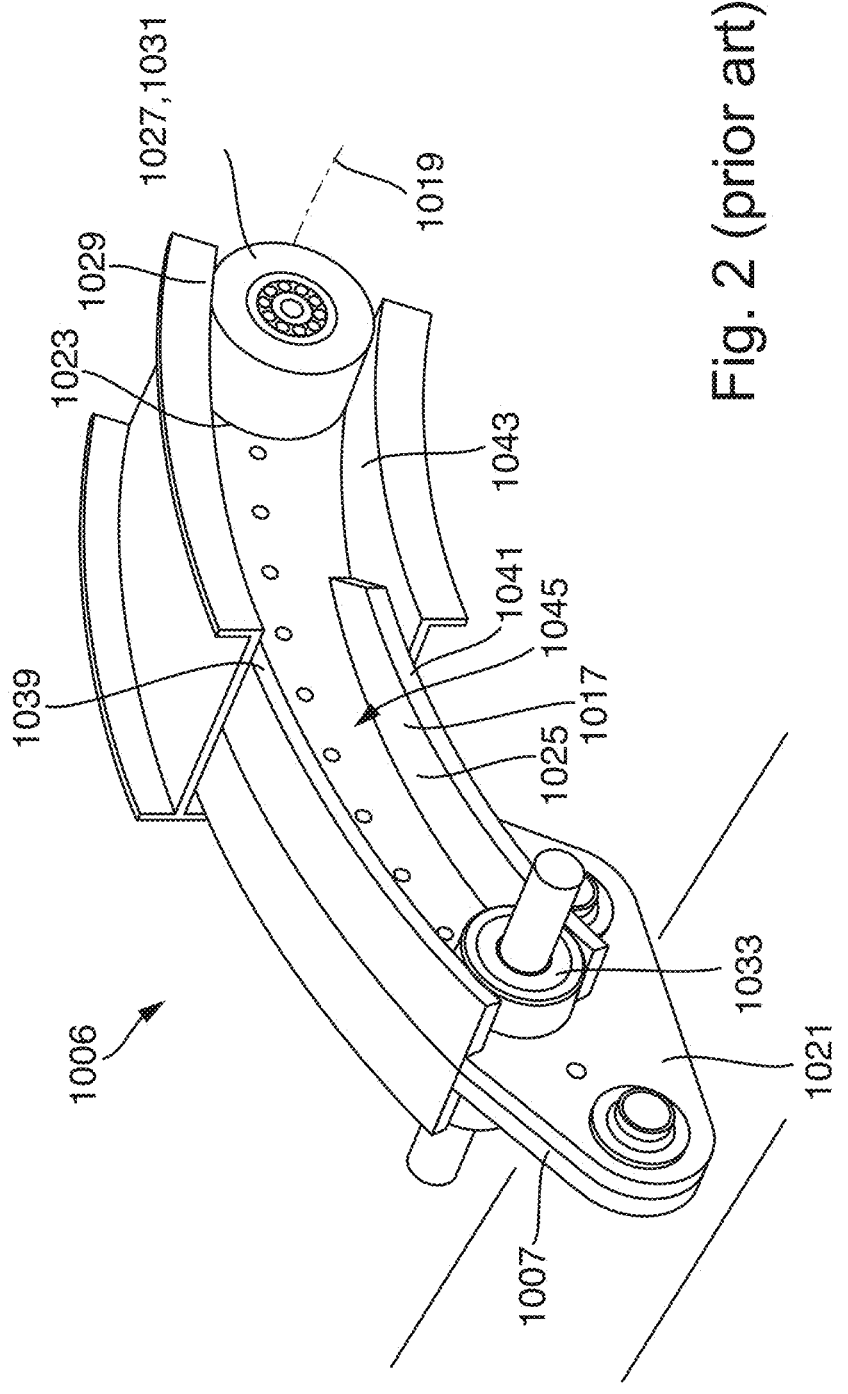
FIG. 2 is a connection assembly according to the prior art.

FIG. 2 shows a connection assembly 1006 of a wing for an aircraft according to the prior art, which is configured to connect a slat to the main wing of an aircraft. The connection assembly 1006 may be used in combination with a wing 1 similar to that as described in FIG. 1, where the wing 1 comprises a main wing 5, a slat 7, and a connection assembly 9 (according to the present disclosure) movably connecting the slat 7 to the main wing 5, such that the slat 7 is movable between a retracted position and at least one extended position.

According to the prior art, the connection assembly 1006 comprises a slat track 1017 that extends along a track longitudinal axis 1019 between a front end 1021 and a rear end 1023 and has an intermediate portion 1025 between the front and rear ends 1021, 1023. The front end 1021 of the slat track 1017 is fixedly mounted to the slat 1007. The rear end 1023 and the intermediate portion 1025 of the slat track 1017 are movably mounted to the main wing 5 by a roller bearing 1027 such that the slat track 1017 is movable along the track longitudinal axis 1019. The roller bearing 1027 comprises a guide rail 1029 fixedly mounted to the main wing 5 and a first roller unit 1031 fixedly mounted to the rear end 1023 of the slat track 1017 and engaging the guide rail 1029. The roller bearing 1027 comprises a second roller unit 1033 that is fixedly mounted to the main wing 5 and that engages an engagement surface 1035 provided at the intermediate portion 1025 of the slat track 1017. As shown in FIGS. 3-5, the slat track 1017 has a profile comprising an upper flange portion 1039, a lower flange portion 1041 and at least one web portion 1043 connecting upper and lower flange portions 1039, 1041. The second roller unit 1033 is arranged in a recess 1045 between upper and lower flange portions 1039, 1041 and engages the engagement surface 1035 provided at the upper flange portion 1039 and at the lower flange portion 1041.

Figures 3A, 3B:
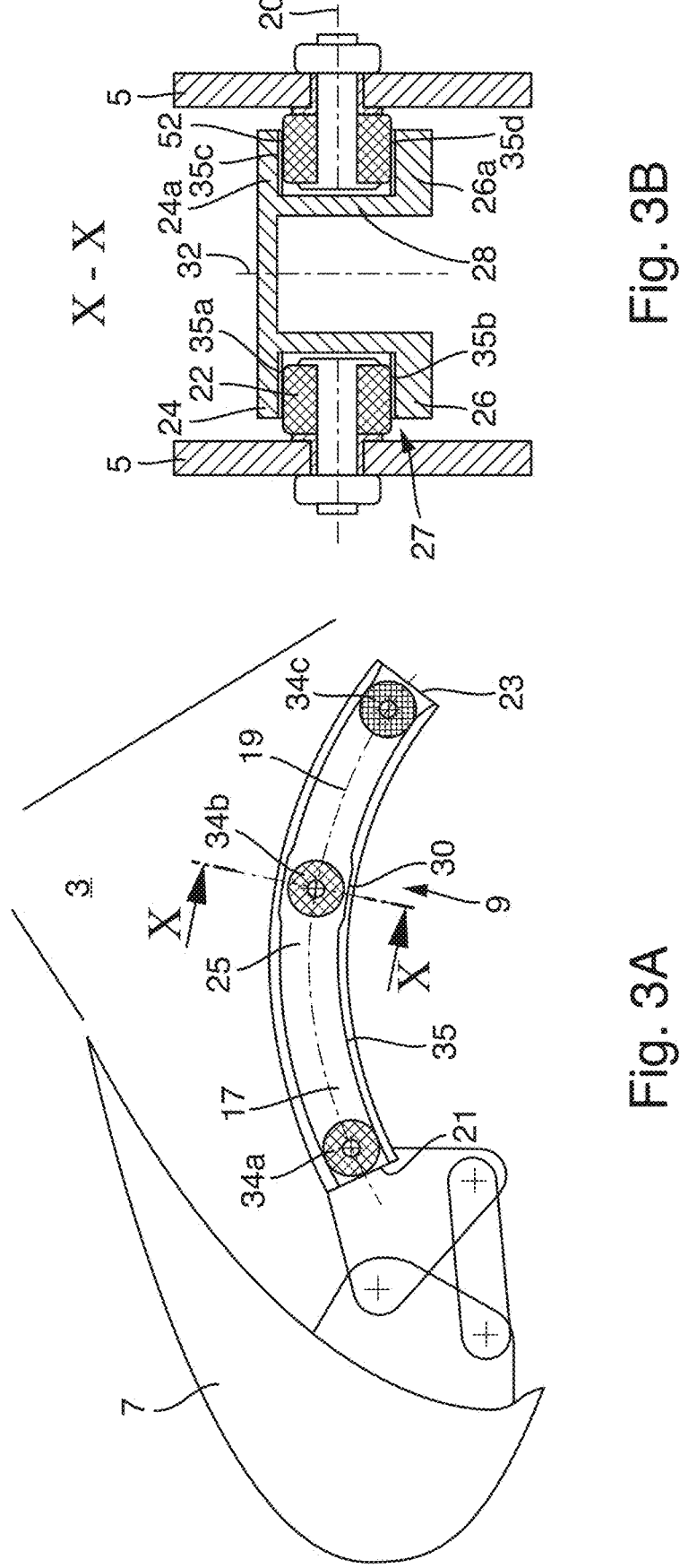
FIG. 3A is a side view of a disclosed connection assembly in a first configuration.
FIG. 3B is a cross sectional view of the connection assembly of FIG. 3A.

FIG. 3A schematically illustrates a main wing 5 of an aircraft comprising a high lift assembly in the retracted configuration, while FIG. 3B shows cross sectional view X-X of FIG. 3A. As illustrated the high lift assembly comprises a high lift body 7, herein sometimes slat, and a connection assembly 9 which movably connects the high lift body 7 to the main wing 5.

The connection assembly 9 comprises an elongate track 17 that extends along a track longitudinal axis 19 between a first end 21 and a second end 23, and has an intermediate portion 25 located therebetween. The high lift body 7 is, in this example, mounted to the first end 21 of the elongate track 17, although may additionally or alternatively be mounted to the intermediate portion 25 thereof.

Illustrated best in FIG. 3B, the elongate track is also mounted to the main wing 5 by a roller bearing 8. The roller bearing 27 permits the track 17 to be moveable along the track longitudinal axis 17 relative to the main wing 5, and therefore also enables movement of the high lift body 7 relative to the main wing 5. As illustrated in FIG. 3A, the roller bearing 27 comprises a plurality of bearing units, in this example three bearing units 34a-c. Each of the bearing units 34a-c is mounted to the main wing 5 and may be mounted by any means possible. In this example, the bearing units 34a-c each comprise a roller bearing and therefore may be bolted to the main wing 5 so as to enable rotation relative thereto, in this example about a roller axis 20 extending in the axial direction of the roller bearing. Here, each of the bearing units comprise a bearing surface 22 for engaging an engagement surface 35 of the elongate track 17.

Illustrated in FIG. 3B, the track 17 comprises a first flange 24 and a second flange 26 connected by a web portion 28. The first and second flange 24, 26 and the web 28 are oriented in a C-shape to define a recess in which the roller/bearing units are at least partially or wholly located. The elongate track 17 may therefore comprise a first and a second internally oriented engagement surface 35a, 35b, which may face each other, and also may extend parallel to one another and optionally parallel to the track longitudinal axis 19. In order to avoid jamming of the bearing units 34a-c, in some examples (such as the example of FIGS. 3A and 3B where the bearing units are in the form of roller bearings) the bearing units 34a-c may be dimensioned such that contact is only possible between one of the engagement surfaces 35a, 35b at any one time.

The bearing units 34a-c of this example are a first end roller unit 34a, an intermediate roller unit 34b and a second end roller unit 34c. Here the intermediate roller unit 34b is positioned between the first end roller unit 34a and the second end roller unit 34c relative to the track longitudinal axis 19 (e.g., positioned in the intermediate portion 25). The first end roller unit 34a is, in the retracted position, positioned at (e.g., adjacent) the first end 21 of the elongate track 17 while the second end roller unit 34c is positioned at the second end 23 of the elongate track 17.

In this example, in the retracted position, load is transferred between the elongate track 17 and the main wing 5 via the first end roller unit 34a and the second end bearing unit 34c. All the load, or substantially all the load, may be transferred between the main wing 5 and the elongate track 17 via the first and second end roller units 34a, 34c in the retracted position, or the principal load (e.g., the majority of the load) may be transferred via the first and second end roller units 34a, 34c.

The elongate track 17 additionally comprises a recessed portion 30. The recessed portion 30 is present in both the first and second flanges 24, 26 of the elongate track 17. The recessed portion 30 extends into the track, and extends in the direction away from the roller axis 20 of the intermediate roller unit 34b. Since the recessed portion 30 extends away from the roller axis 20 of the intermediate roller 34b, it may cause a reduction or elimination in the contact force between the intermediate roller 34b and the engagement surface 35, and in some examples (such as this example) may permit disengagement of the intermediate roller 34b with the engagement surface 35 (e.g., with both engagement surfaces 35a, 35b) such that a clearance gap 52 exists therebetween. Thus, the loads between the main wing 5 and the elongate track 17 may be transferred through the first and second end bearing units 34a, 34c (in this example, roller units). As such, only two roller units in contact with the engagement surface 35a and/or 35b may transfer force between the main wing 5 and the elongate track 17, thereby avoiding additional forces as a result of the connection assembly 9 being over-constrained in the retracted position.

In this example the recessed portion 30 comprises a graduated transition to the engagement surface 35 on which it is located, which is illustrated in this way in the form of a ramp. The recessed portion may form part of the engagement surface 35 (meaning that it may be possible for the intermediate roller unit 34b to come into contact with part thereof). Additionally or alternatively, the recessed portion may represent a discontinuity in the engagement surface and divide the engagement surface into a first engagement surface extending in a first direction parallel to the track longitudinal axis, and a second engagement surface extending in a second direction parallel to the track longitudinal axis.

As clearly illustrated in FIG. 3B, the connection assembly 9 and roller bearing 27 shown in FIG. 3A are mirrored about the plane 32 extending parallel to the track longitudinal axis 19 and perpendicular to the roller axis 20. As such, the connection assembly 9 comprises a second set of flanges 24a, 26a comprising a second set of engagement surfaces 35c, 35d and a second bearing 27a comprising a second set of bearing units 34d-f. For the sake of conciseness, a description of the mirrored connection assembly will not be provided, although the skilled reader will appreciate that it is as described above in relation to the connection assembly 9.

Illustrated herein, the cross-section of the connection assembly 9, and the elongate track 17 of the connection assembly has a substantially pi (π) shape formed by the first C-shaped connected flanges 24, 26 and web portion 28, and equivalent mirrored C-shaped flanges 24a, 26a and web portion being separated by an intermediate space therebetween. However, it should also be noted that no intermediate space may be present. In this case, the cross-sectional shape may be an I-shape, or a double T-shape, while still comprising both the first and mirrored C-shaped flanges 24, 24a, 26, 26a and web portion 28. In this case, the web portion 28 may be shared between the sets of flanges 24, 24a, 26, 26a.

Figures 4A, 4B:
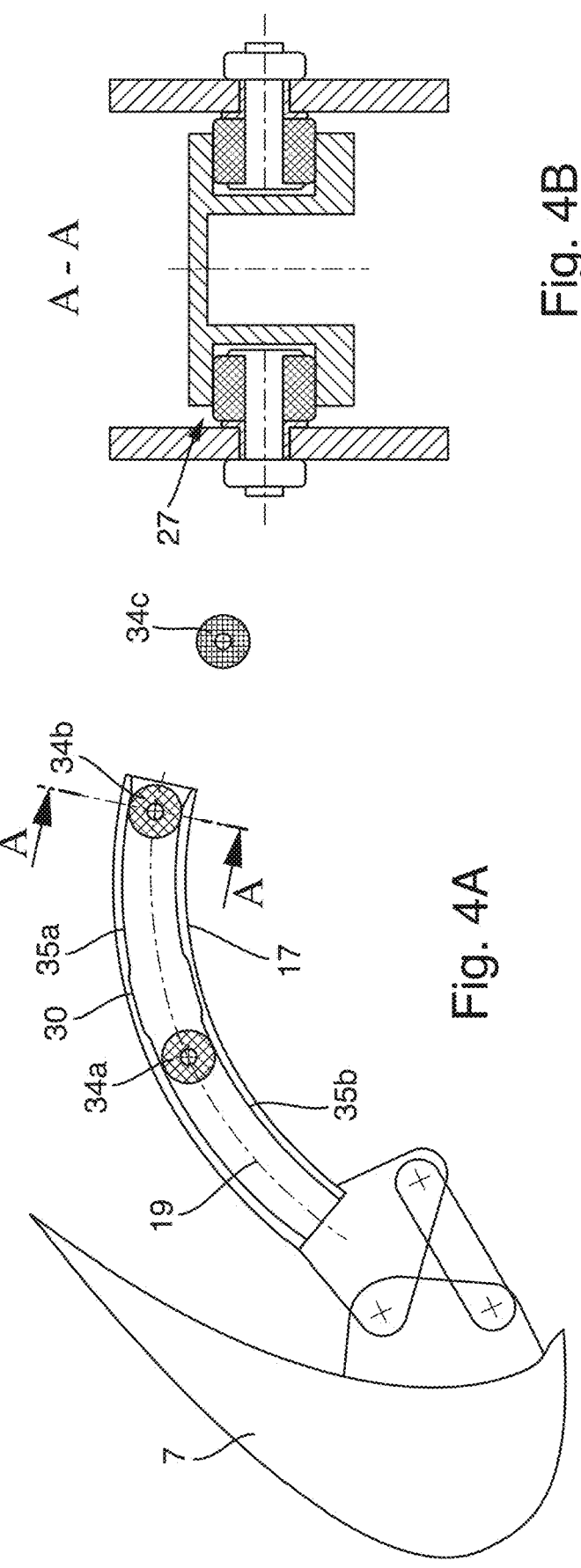
FIG. 4A is a side view of a disclosed connection assembly in a second configuration.
FIG. 4B is a cross sectional view of the connection assembly of FIG. 4A.

FIG. 4A illustrates the high lift body 7 of FIG. 3A in an extended position. FIG. 4B illustrates cross section A-A of FIG. 4B. Here, the elongate track 17 has moved relative to the roller bearing 27. In the extended position, neither of the engagement surfaces 35a, 35b are in contact with the second end bearing unit 34c. Further, the recessed portion 30 is no longer aligned along the track longitudinal axis 19 with the intermediate roller unit 34b (see also in FIG. 4B, there is no gap illustrated between the intermediate bearing 33b on one side thereof, whereas on another side thereof a gap is present to prevent the intermediate bearing 34b from becoming wedged in the track 17), such that the intermediate roller unit 34 is in contact with one of the engagement surfaces 35a, 35b, as is the first end roller unit 34a. As such, in the illustrated extended position, the first end roller unit 34a and the intermediate roller unit 34b transfer forces between the main wing 5 and the elongate track 17 (e.g., all the forces are transferred by the first end and intermediate roller units 34a, 34b, or the principal force is transferred by the first end and intermediate roller units 34a, 34b). Again, only two roller/bearing units are in contact with the engagement surface 35a and/or 35b, while the third is disengaged with the elongate track 17. This avoids additional forces as a result of the connection assembly 9 being over constrained.

Figure 5B:
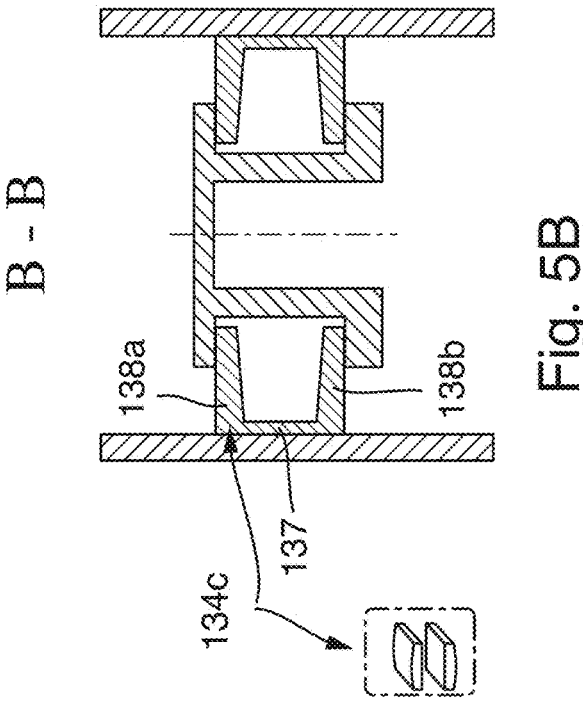
FIG. 5B is a cross sectional view of the connection assembly of FIG. 5A.
Figure 5A:
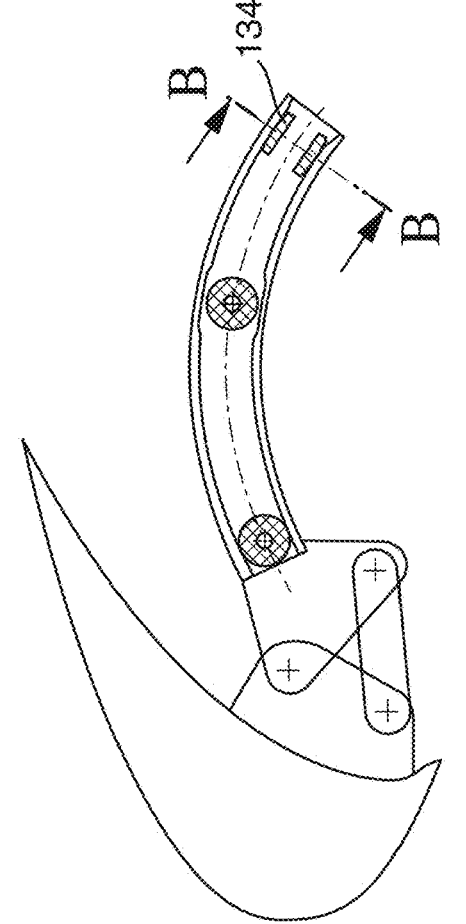
FIG. 5A is a side view of a disclosed connection assembly in a third configuration.

FIGS. 5A and 5B illustrate a further example of a connection assembly 9 in a wing of an aircraft. The example of FIGS. 5A and 5B is similar to that as previously described in relation to FIGS. 3A and 3B, and 4A and 4B, and for the sake of conciseness similar features will not be described again. Further, similar reference numerals will be used to refer to similar features of FIGS. 3A to 4B, augmented by 100.

In contrast to the previous Figures, the second end bearing unit 134c is in the form of a pair of contact pads. Although two contact pads are illustrated in FIGS. 5A and 5B, the contact pads are joined by a web portion 137, such that the contact pads are defined by a single second end bearing unit 134c comprising two contact pads, each having a contact surface 138a,b configurable to contact an engagement surface 135a,b so as to enable sliding contact therebetween. In this example, the contact surface 138a,b is a crowned surface so as to maximize the contact area and spread out the stress concentrations in the contact area between the contact surfaces 138a,b and the respective engagement surface 135a,b.

Figures 6A, 6B, 7:
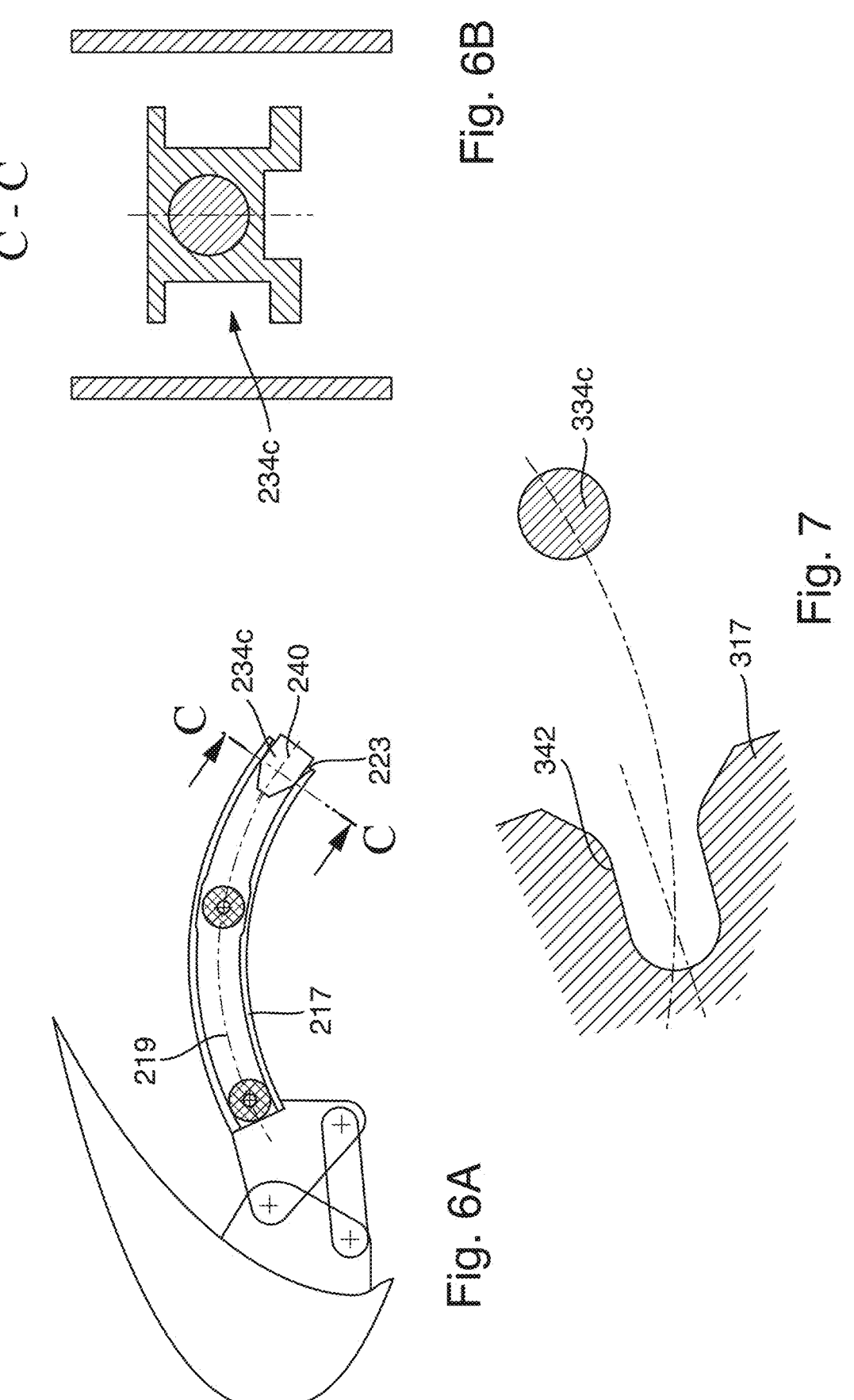
FIG. 6A is a side view of a disclosed connection assembly in another configuration.
FIG. 6B is a cross sectional view of the connection assembly of FIG. 6B.
FIG. 7 is a schematic view of an engagement profile of the elongate track for the second end bearing.

A similar idea is illustrated in FIGS. 6A and 6B in which the second end bearing unit 234c comprises a portion that is in the shape of a frustum-cone. In this example the central axis 240 of the frustum-cone is aligned with at least a part of the track longitudinal axis 219. It should be noted that, although in this example the second end bearing unit 234c comprises the shape of both a frustum-cone and a cylinder, it may comprise the shape of a full cone, and/or may not comprise a cylindrical shaped section. In addition, the second end 223 of the elongate track 217 is chamfered so as to increase the distance between the first and second flanges 224, 226. The frustum-conical shape of the second end bearing unit 234c, and the chamfered second end 223 assist with aligning the second end bearing unit 234c with the elongate track 217 for example when the track 217 moves into contact with the second end bearing unit 234c into the retracted position.

FIG. 7 illustrates the second end bearing unit 334c as a protrusion (e.g., a cylindrical protrusion) mounted to the main wing (see FIG. 3A), while the elongate track 317 comprises a profile 342 (e.g. a recess) into which the second end bearing unit 334c may mate. Similar to FIG. 6A, the profile may be chamfered so as to assist to guide the second end bearing unit 334c into the mating profile.

FIGS. 8A and 8B, and 9A and 9B, illustrate an example in which the roller bearing comprises a pair of first end roller units 434a, 436a, a pair of intermediate roller units 434b, 436b and a pair of second end roller units 434c, 436c. Here, the elongate track 417 comprises a first and second externally oriented engagement surface 435a, 435b. In the retracted position as illustrated in FIG. 8A, the first end roller unit 434a and the second end roller unit 434c are in contact with engagement surface 435a, while the other first end roller unit 436c and the other second end roller unit 436c are in contact with engagement surface 435b. Both of the first and second externally oriented engagement surface 435a, 435b comprise a recessed portion, which is recessed so as to extend in a direction away from the roller axis of the intermediate roller unit 434b, 436b associated with the engagement surface 435a,b in which the recessed portion is located. It this example, the elongate track 417 may comprise a single set of roller/bearing units, which may be elongated so as to stretch between the previously defined first and second sets of engagement surfaces. As illustrated in FIG. 8B, the first and second sets of engagement surfaces may be merged to form just one engagement surface 435a, or may still be separated as two distinct engagement surfaces 435c, 435d. It should be noted that it is also possible for there to be a similar example in which a first and second set of roller/bearing units is possible, rather than single elongated roller/bearing units.

FIGS. 9A and 9B illustrate the high lift body in an extended configuration. Similar to as previously described, in the retracted configuration the pair of intermediate bearing units 434b, 436b are disengaged from the respective engagement surface 435a,b, and in an extended configuration, the second end roller units 434c, 436c are disengaged from the respective engagement surface 435a,b.

Figure 10:
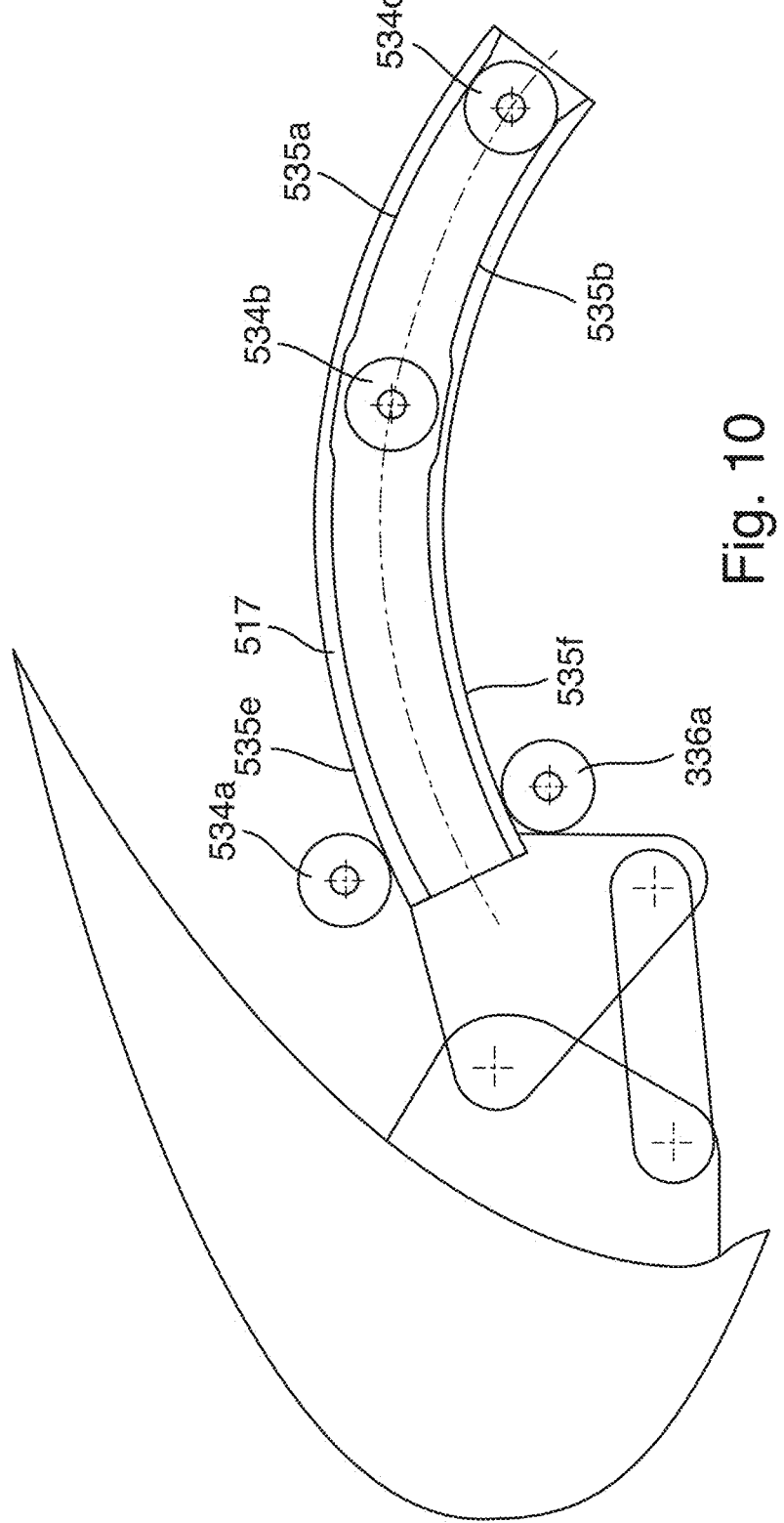
FIG. 10 is another further example of the disclosed connection assembly.

FIG. 10 illustrates an example in which there are a pair of first end roller bearing units 534a, 536a but just a single intermediate roller bearing unit 534b and a single second end roller bearing unit 534c. Here the elongate track 517 comprises a first and second internally oriented engagement surface 535a, 535b and a first and second externally oriented engagement surface 535e, 535f. The pair of first end roller bearing units 534a, 536a engage the first and second externally oriented engagement surfaces 535e, 535f respectively, while the intermediate roller bearing unit 534b is configured to engage the first and second internally orientated engagement surfaces 535a, 535b, as is the second end roller bearing unit 534c. Since the intermediate roller bearing unit 534b is configured to engage the internally oriented engagement surfaces 535e, 535f, the recessed portion is located on the internally oriented engagement surfaces 535e, 535f.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising
  a main wing, and a high lift assembly comprising
  a high lift body, and
  a connection assembly movably connecting the high lift
    body to the main wing, such that the high lift body
    is movable between a retracted position and at least
    one extended position,
  wherein the connection assembly comprises an elon-
    gate track that extends along a track longitudinal axis
    between a first end and a second end and has an
    intermediate portion between the first and second
    ends,
  wherein the first end of the track, or the intermediate
    portion of the track, or both are mounted to the high
    lift body,
  wherein the elongate track is mounted to the main wing
    by a roller bearing such that the elongate track is
    movable along the track longitudinal axis,
  wherein the roller bearing comprises a plurality of
    bearing units, each of the bearing units being
    mounted to the main wing and having a bearing
    surface for engaging an engagement surface pro-
    vided on the elongate track,
  wherein the plurality of bearing units comprise a first
    end roller unit, an intermediate roller unit, and a
    second end bearing unit,
  wherein the plurality of bearing units are positioned
    such that, relative to the track longitudinal axis, the
    intermediate roller unit is positioned between the
    first end roller unit and the second end bearing unit,
  wherein the elongate track and the roller bearing are
    configured such that in the retracted position main
    loads are transferred between the elongate track and
    the roller bearing via the first end roller unit and the
    second end bearing unit and in the at least one
    extended position main loads are transferred
    between the elongate track and the roller bearing via
    the first end roller unit and the intermediate roller
    unit,
  wherein in the retracted position, the intermediate roller
    unit is configured to disengage with the engagement
    surface such that a clearance gap exists between the
    intermediate roller unit and the engagement surface,
    and the first end roller unit and the second end
    bearing unit are configured to engage the engage-
    ment surface, and
  wherein in an extended position, the second end bear-
    ing unit is configured to disengage with the engage-
    ment surface and the intermediate roller unit and the
    first end roller unit is configured to engage with the
    engagement surface.
2. The wing according to claim 1, wherein the engage-
ment surface is configured to be simultaneously engaged by
the first end roller unit and either the intermediate roller unit
or the second end bearing unit.
3. The wing according to claim 1, wherein the elongate
track comprises a recessed portion,
  wherein, in the retracted position, the recessed portion is
    configured to align along the track longitudinal axis
    with the intermediate roller unit such that a contact
    force between the intermediate roller unit and the
    engagement surface of the elongate track is eliminated
    or reduced.
4. The wing according to claim 3, wherein the recessed
portion defines a discontinuity in the engagement surface
dividing the engagement surface into a first engagement
surface extending in a first direction parallel to the track longitudinal axis, and a second engagement surface extend-
ing in a second direction parallel to the track longitudinal
axis,
  wherein the first end roller unit is configured to engage the
    first engagement surface, and the intermediate roller
    unit and the second end bearing unit are configured to
    engage the second engagement surface.
5. The wing according to claim 3, wherein the recessed
portion comprises a ramp forming a graduated transition to
the engagement surface.
6. The wing according to claim 1, wherein the second end
bearing unit is a roller unit.
7. The wing according to claim 1, wherein the second end
bearing unit comprises a contact pad arrangement compris-
ing at least one contact pad surface comprising a crowed
surface.
8. The wing according to claim 1, wherein the second end
bearing unit comprises a conical or frustum-conically
shaped bearing which, when engaged with the engagement
surface, comprises a longitudinal axis that is parallel with
the track longitudinal axis.
9. The wing according to claim 1, wherein the second
bearing unit comprises a protrusion mounted to the main
wing, and the elongate track comprises a recess having a
profile configured to receive and mate with the second end
bearing unit.
10. The wing according to claim 1, wherein the elongate
track comprises a first and second internally oriented
engagement surface and a first and second externally ori-
ented engagement surface, the first internally oriented
engagement surface facing the second internally oriented
engagement surface, and the first externally oriented
engagement surface facing away from the second externally
oriented engagement surface, and
  wherein each of the first end roller unit, the intermediate
    roller unit, and the second end bearing unit is config-
    ured to engage at least one of the first and second
    internally oriented engagement surfaces and the first
    and second externally oriented engagement surfaces.
11. The wing according to claim 10, wherein the plurality
of bearing units comprises a pair of first end roller units, one
of the pair of first end roller units configured to engage the
first externally oriented engagement surface, and the other of
the pair of first end roller units configured to engage the
second externally oriented engagement surface, and the
intermediate roller unit and second end bearing unit being
configured to engage at least one of the first and second
internally oriented engagement surfaces.
12. The wing according to claim 10, wherein the plurality
of bearing units comprises a pair of first end roller units, a
pair of intermediate roller units, and a pair of second end
bearing units, one of the pair of first end roller units, one of
the pair of intermediate roller units, and one of the pair of
second end bearing units being configured to engage the first
externally oriented engagement surface and the other of the
pair of first end roller units, the other of the pair of
intermediate roller units, and the other of the pair of second
end bearing units configured to engage the second externally
oriented engagement surface.
13. A high lift assembly for a main wing, the high lift
assembly comprising:
  a high lift body, and
  a connection assembly configured for movably connect-
    ing the high lift body to the main wing, such that the
    high lift body is movable between a retracted position
    and at least one extended position, wherein the connection assembly comprises an elongate track that extends along a track longitudinal axis between a first end and a second end and has an intermediate portion between the first and second ends, wherein the first end of the track, or the intermediate portion of the track, or both are mounted to the high lift body, wherein the elongate track is configured to be mounted to the main wing by a roller bearing such that the track is movable along the track longitudinal axis;

wherein the roller bearing comprises a plurality of bearing units, each of the bearing units being configured to be mounted to the main wing and having a bearing surface configurable to engage an engagement surface provided on the elongate track, wherein the plurality of bearing units comprises a first end roller unit, an intermediate roller unit, and a second end bearing unit, wherein the plurality of bearing units are positioned such that, relative to the track longitudinal axis, the intermediate roller unit is positioned between the first end roller unit and the second end bearing unit; and wherein the elongate track and the roller bearing are configured such that in the retracted position main loads are transferred between the elongate track and the roller bearing via the first end roller unit and the second end bearing unit and, in the at least one extended position main loads are transferred between the elongate track and the roller bearing via the first end roller unit and the intermediate roller unit, wherein in the retracted position, the intermediate roller units are configured to disengage with the engagement surfaces such that a clearance gap exists between the intermediate roller units and the engagement surfaces, and the first end roller units and the second end bearing units are configured to engage the engagement surfaces, and wherein in an extended position, the second end bearing units are configured to disengage with the engagement surfaces and the intermediate roller units and the first end roller units are configured to engage with the engagement surfaces.

14. An aircraft comprising:
the high lift assembly according to claim 13.

\* \* \* \* \*